(12) United States Patent
Vadekar

(10) Patent No.: US 8,396,212 B2
(45) Date of Patent: *Mar. 12, 2013

(54) METHOD AND APPARATUS FOR GENERATING A KEY STREAM

(75) Inventor: Ashok Vadekar, Mississauga (CA)

(73) Assignee: Certicom Corp., Mississauga, Ontario (CA)

(*) Notice: Subject to any disclaimer, the term of this patent is extended or adjusted under 35 U.S.C. 154(b) by 81 days.

This patent is subject to a terminal disclaimer.

(21) Appl. No.: 12/821,882

(22) Filed: Jun. 23, 2010

(65) Prior Publication Data

US 2010/0260335 A1 Oct. 14, 2010

Related U.S. Application Data

(63) Continuation of application No. 10/348,756, filed on Jan. 23, 2003, now Pat. No. 7,769,169.

(60) Provisional application No. 60/350,017, filed on Jan. 23, 2002, provisional application No. 60/350,380, filed on Jan. 24, 2002.

(51) Int. Cl.
  *H04L 29/06* (2006.01)
(52) U.S. Cl. .......................................... 380/42; 380/44
(58) Field of Classification Search .................. 380/44, 380/42
See application file for complete search history.

(56) References Cited

U.S. PATENT DOCUMENTS

| 5,107,451 | A | * | 4/1992 | Houk | 708/491 |
| 5,202,846 | A | * | 4/1993 | Rasmussen et al. | 708/276 |
| 2001/0029524 | A1 | | 10/2001 | Smith et al. | |
| 2002/0048364 | A1 | * | 4/2002 | Gligor et al. | 380/37 |
| 2003/0091185 | A1 | * | 5/2003 | Swindlehurst et al. | 380/44 |
| 2003/0206634 | A1 | | 11/2003 | Rose | |

OTHER PUBLICATIONS

Menezes, Alfred, Paul Oorschot, Scott Vanstone. Handbook of Applied Cryptography. CRC Press, 1997. p. 399.*
Menezes, A. et al.; Handbook of Applied Cryptography; 1997; pp. 399; CRC Press, Boca Raton, Florida.
Yahoo.ca Press Release; RSA Security Helps Create Solution to Secure Wireless LANs; , Dec. 17, 2001; retrieved from http://biz.yahoo.com/prnews/011217/sfm074.sub.--1.html.
Yahoo.ca Press Release; "RSA announces fix for wireless network security hole"; Dec. 27, 2001; retrieved from http://biz.yahoo.com/rf/011217/n14192804.sub.--2.html.

* cited by examiner

*Primary Examiner* — Jason Gee
(74) *Attorney, Agent, or Firm* — Dimock Stratton LLP; Etienne de Villiers

(57) ABSTRACT

A method of generating a key stream for a precomputed state information table. The method comprises initializing a counter and an accumulator with non-zero values; combining state information identified by the counter with the accumulator; swapping state information identified by the counter with state information identified by the accumulator; combining the two pieces of state information; outputting the state information identified by the combination as a byte of the key stream; adding a predetermined number odd number to the counter; and repeating the above steps to produce each byte of the key stream.

16 Claims, 3 Drawing Sheets

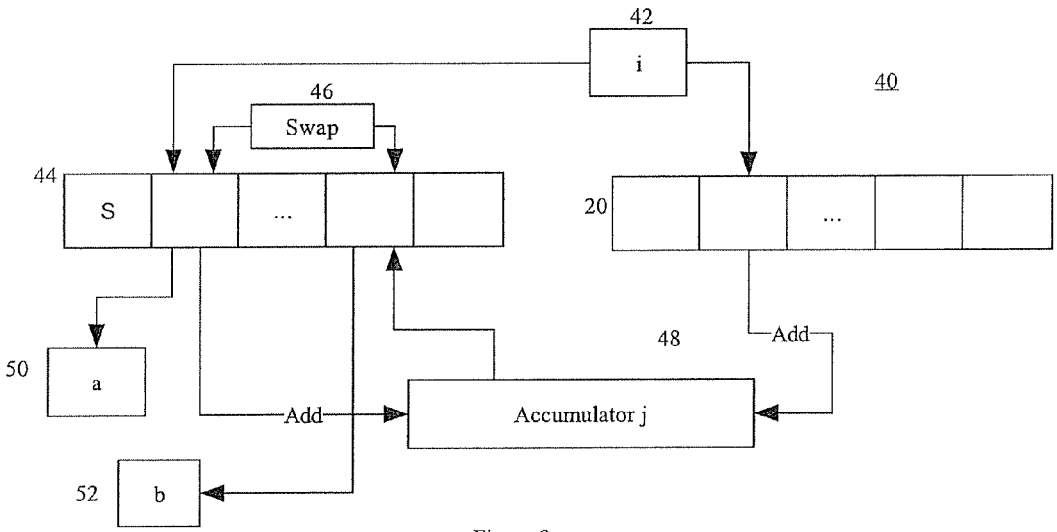
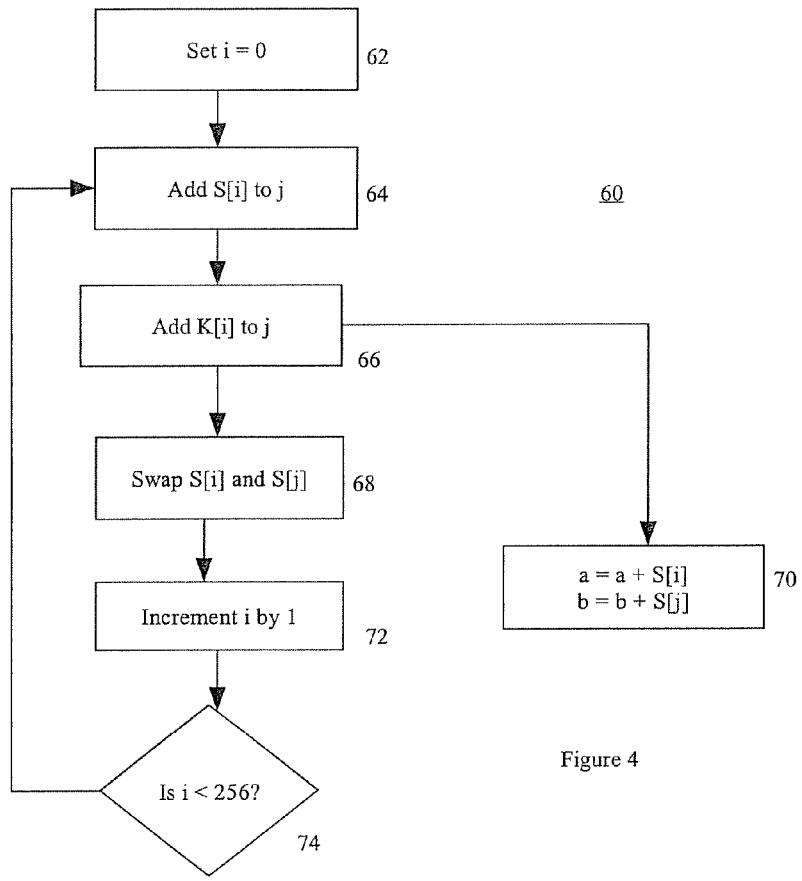
Figure 3
Figure 4

METHOD AND APPARATUS FOR GENERATING A KEY STREAM

This application is a continuation of U.S. patent application Ser. No. 10/348,756 filed on Jan. 23, 2003 which claims priority from U.S. Provisional Application No. 60/350,017 filed on Jan. 23, 2002 and U.S. Provisional Application No. 60/350,380 filed on Jan. 24, 2002, all of which are hereby incorporated by reference.

FIELD OF THE INVENTION

The present invention relates to generating a key stream.

DESCRIPTION OF THE PRIOR ART

Early multimedia broadcasts consisted of radio or television programs sent over the air waves. Anyone with a tuner could access the broadcast. Premium services impose access controls by such means as scrambling the signals. Content providers control access to the descramblers.

There are many types of multimedia transmissions including radio, television, sound, video, and animations. This may be sent over land lines or over wireless channels, over long or short distances, or even through satellite transmission, or through a combination of channels.

When multimedia content is broadcast, it is often desired to prevent unauthorized parties from reading the content. This may be accomplished by encrypting the content using a stream cipher. A secret key is used in the encryption and must be shared with the desired recipients of the content.

A commonly used stream cipher which may be used for multimedia broadcasts is known by the trade name RC4. However, this stream cipher has been shown to have certain weaknesses, which may be exploited. These include the invariance weakness, and some leakage of keying material.

Therefore it is an object of the present invention to obviate or mitigate the above disadvantages.

SUMMARY OF THE INVENTION

According to one aspect of the present invention, there is provided a method of generating a key stream from a precomputed state information table. The method comprises initialising a counter and an accumulator with non-zero values; combining state information identified by the counter to the accumulator; swapping state information identified by the counter with state information identified by the accumulator; combining the two pieces of state information; outputting the state information identified by the combination as a byte of the key stream; adding a predetermined odd number to the counter; and repeating the above steps to produce each byte of the key stream.

In another aspect of the present invention, there is provided a computer readable medium containing instructions for a computer to generate a key stream from a precomputed state information table. The key stream generation comprises initialising a counter and an accumulator with non-zero values; combining state information identified by the counter with the accumulator; swapping state information identified by the counter with state information identified by the accumulator; combining the two pieces of state information; outputting the state information identified by the combination as a byte of the key stream; combining a predetermined odd number with the counter; and repeating the above steps to produce each byte of the key stream.

A further aspect of the present invention, there is provided in a stream cipher, a method of generating a key stream from state information derived from a secret key. The improvement comprises initialising registers to non-zero values; and incrementing a counter with a predetermined odd number greater than 1.

BRIEF DESCRIPTION OF THE DRAWINGS

These and other features of the preferred embodiments of the invention will become more apparent in the following detailed description in which reference is made to the appended drawings wherein:

FIG. 3 is a schematic representation of a circuit used in the key stream generator of FIG. 1.

FIG. 4 is a flow chart showing steps performed by the circuit of FIG. 3.

DESCRIPTION OF THE PREFERRED EMBODIMENTS

Figure 1:
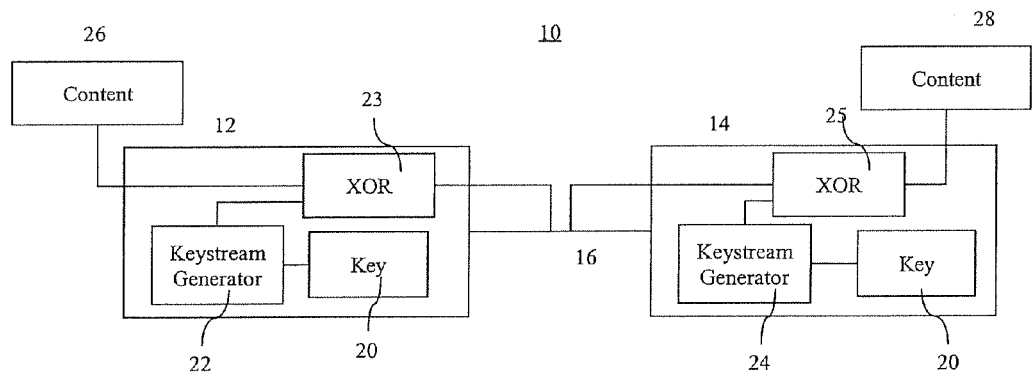
FIG. 1 is a schematic representation of communication system.

Referring to FIG. 1, a communication system 10 includes a pair of correspondents 12, 14. A communication channel 16 allows the correspondents to communicate with each other. The correspondents 12, 14 share a secret key 20 through a secure channel prior to initiating communications. Each correspondent has a key stream generator 22, 24, each connected to a respective XOR gate 23, 25. The correspondent 12 wishes to send content 26 through the communication channel 16 to the correspondent 14, where the content 28 may be recovered and viewed. The key stream generators 22, 24 each use the common secret key 20 to derive a common key stream. The common key stream is used by the correspondent 12 to encrypt the content 26 into an encrypted signal, and by the correspondent 14 to decrypt the encrypted signal and obtain the content 28. The encrypted signal is transmitted over the communication channel 16. The content 26 is a stream of data nationally divided into bytes.

Figure 2:
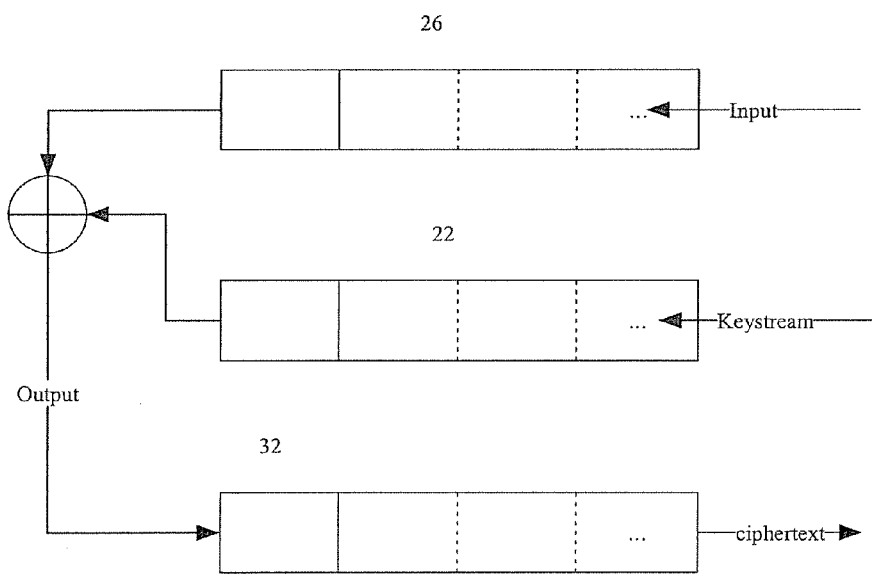
FIG. 2 is a schematic representation of the encryption used in FIG. 1.

Referring to FIG. 2, the nature of the encryption permormed by the correspondents 12, 14 is shown in more detail. The encryption operates on each byte of the content 26 in turn. Each byte of the content is encrypted with a corresponding byte of the key stream 22. The bytes of the content and the key stream are operated on by an XOR gate 23, which combines them to obtain the corresponding byte of the output cipher text 32. The XOR gate 23 implements a bitwise exclusive- or operation meaning one or the other but not both.

Referring to FIG. 3, initialization of the key stream generator is shown generally as numeral 40. The key stream generator includes a counter i (42), state information table S (44), a swap mechanism 46, and an accumulator j (48). The state information table S comprises 256 table entries addressed by the numbers 0 to 255, each of which may have a value from 0 to 255. Notationally, S [10] refers to the 10$^{th}$ entry in the table for example. Initially, each table entry has the same value, as its position, i.e. 0 is in position 0, 1 is in position I, etc that is, S[i]=I for each from 0 to 255. The key stream further includes registers a (50) and b (52). The key stream generator takes as input the key 20. The counter i (42) designates both a position (address) in the table of state information 44 and a corresponding byte in the key 20. The designated table entry and byte of the key are connected to the accumulator j (48) which adds the values mod 256 and stores the result in the accumulator 48. The result in the accumulator 48 designates the address (position) of the entry in the table of the state information S. The swap mechanism 46 connects the table entries in the positions indicated by the counter i and the accumulator j in order to exchange their contents. The registers 50 and 52 operate to add the entries in the state information table designated by i and j to their respective contents a and b.

Referring to FIG. 4, the steps performed by the circuit of FIG. 3 are shown generally by the numeral 60. The counter i is first set to 0 (62). Then, the table entry of the state information designated by the number i (that is S[i]) is added to the accumulator I (64). The byte in position i of the key 20 (that is K[i]) is also added to j (66). The table entries in positions i and j in the state information table (S [i] and S[j]) are then added to respective ones of the registers a and b (70), then the table entries in positions i and j (S[i] and S[j]) are exchanged (68). The counter i is incremented (72) by 1. Then, if the counter i is less than 256 (74), the process repeats at step 64. This continues until a total of 256 iterations have been performed. At this time, the entries of the state information table 44 are randomly distributed, due to the random nature of the key within register 20. This mixing is performed prior to transmission over the channel 16. The contents of registers 50, 52 similarly contain a pair of values, accumulated mod 256 in a random manner. The contents of the state information table 44 and the registers 50, 52 are then used to generate a key stream.

Figure 5:
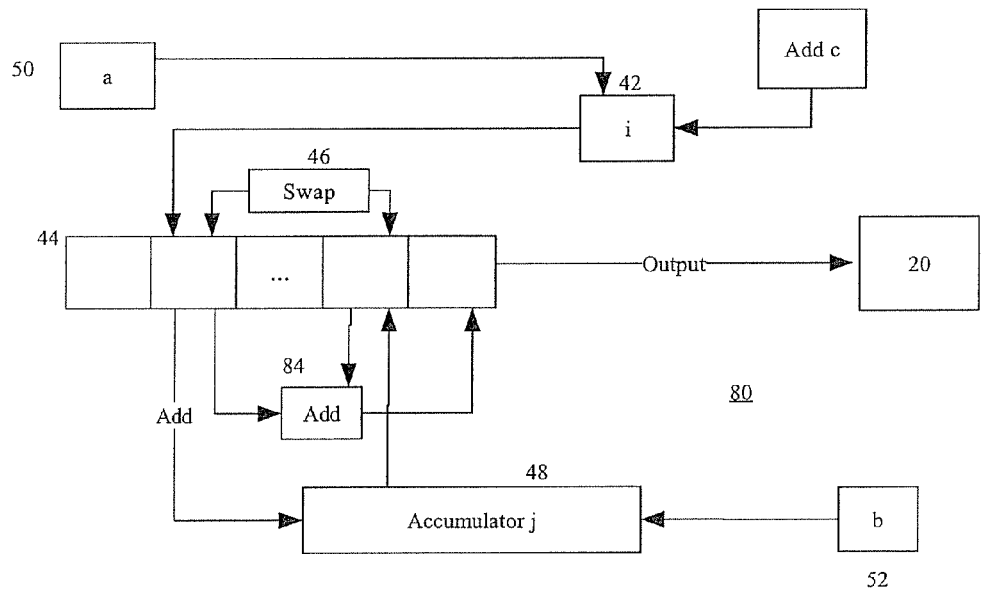
FIG. 5 is schematic representation of a component of a key stream generator of FIG. 1.

Referring to FIG. 5, the circuit of the key stream generator used to produce the key stream is shown generally as numeral 80 and uses the components described above, as well as an adding circuit 84 and an odd number c. The counter i (42) selects an entry (S[i]) of the state information table S 44, which is in turn connected to the accumulator j (48) for addition thereto. The result stored in the accumulator 48 again designates a table entry of state information 44. The swap mechanism 46 operates to exchange the table entries designated by counter i and accumulator j. The adding circuit 84 is connected to the table entries designated by i and j (namely S[i] and S[j]) to add them together, and to determine the cell designated thereby. The contents of this cell 86 is output as a byte of the key stream. Registers 50 and 52 are connected to the counter i and the accumulator j respectively to initialize the registers 42, 48 with the values a, b.

Figure 6:
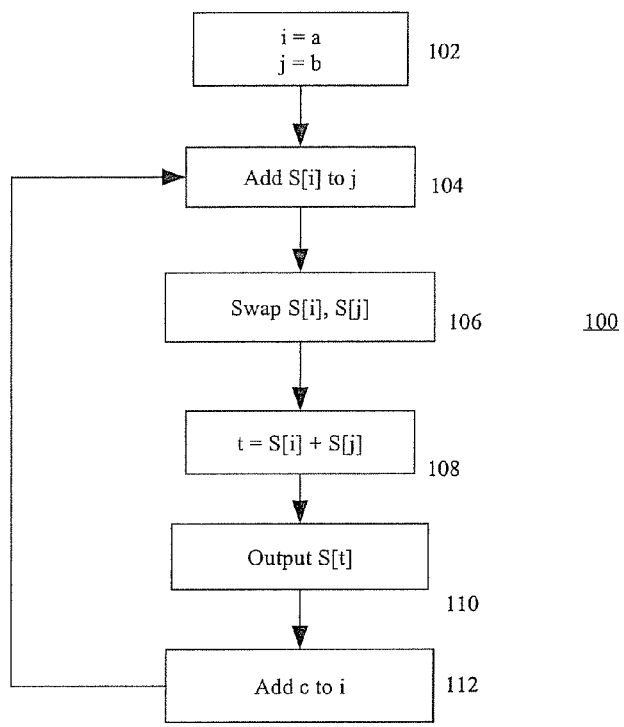
FIG. 6 is a flowchart showing the method of FIG. 5.

Referring to FIG. 6, the steps performed by the circuit of FIG. 5 are shown generally as numeral 100. The counter i is set to the value a (102) and the accumulator j is set to the value b (102). Then, the table entry in position i in the state information table (S [j]) is added to the accumulator j (104). The table entries in positions i and j in the state information table are then exchanged (106). The adding mechanism 84 then computes the value t equal to the sum of the table entries in the positions i and j in the state information table (108). The contents of cell designated t (S[t]) are then output for use as a key stream (110). Then, the value c is added to i (112) and the process repeats with step 104.

It will be recognized that with the provision of the values a and b in the generation of the key stream, there is less predictability than when these values are initially set to 0. Further, the use of a constant value c provides further unpredictability in the order of the swaps performed. The constant value c may be publicly known, and may be derived from a session identifier or an SID. A particularly convenient value to use for c is the bit-wise OR of SID with 1, which is the smallest odd integer larger than or equal to SID.

It will be recognized that the use of 256 positions in the table S is merely for convenience and compatibility with existing protocols. It is possible to use any value n in place of the 256, with appropriate changes to the modular arithmetic, and the initial entries in the state information table. The key stream will then be made up of larger blocks, and accordingly the content would be regarded as larger units as will be understood by one skilled in the art. It will further be understood that the value c should be suitably chosen, and typically will be relatively prime to the modulus n.

For efficiency reasons, the constant c that is used in the key stream a generator should be easy to compute from publicly known information and the key K. For security reasons, one should require that gcd(c,n)=1, since the security can be expected to decrease if c and n have a nontrivial common factor. The 'optima' value of this constant depends on whether or not the keys used with the stream-cipher are correlated and, if so, how.

The embodiment above describes one possible method for computing the initialization value (a,b) used in the key stream generator. There are many options for specifying this initial value; this choice seemed to be the most efficient one. From a security perspective, the main requirement is that the initialization values (a,b) should be unpredictable and uncorrelated if one does not have access to the keys used. In addition, it should be noted that the main attack proposed against RC4 does not seem to work any more, once one takes the initial value (a,b) of the counter pair such that a is sufficiently big.

It may be seen that the circuit of the above embodiment may be made interoperable with RC4 if one takes c=1 and forces (a,b):=(0,0). Further interoperability may be achieved if one takes as key the string Key:=(K)$_N$, where K is the key used with the actual stream-cipher RC4.

It is possible to generalize the stream cipher of the above embodiment even further, e.g., by making the actions of the key stream generator dependent on the key K as well.

Although the invention has been described with reference to certain specific embodiments, various modifications thereof will be apparent to those skilled in the art without departing from the spirit and scope of the invention as outlined in the claims appended hereto.

The invention claimed is:

1. A method of generating a key stream, the method being performed by a correspondent in a communication system, the correspondent including a counter i, an accumulator j, and a state information table S having state information stored in n entries therein, the method comprising:
   a) said correspondent using the counter i, the accumulator j, and the state information table S to:
      i) randomly distribute entries of the state information table S by swapping pairs of entries; and,
      ii) generate a pair of non-zero values a and b by, for each swapping pair, adding an entry to a and adding the other entry to b;
   b) said correspondent initializing the counter i with a and said correspondent initializing the accumulator j with b;
   c) said correspondent obtaining a constant odd value, c, greater than 1;
   d) said correspondent combining with a current value for the accumulator j, state information identified by entry i in the state information table S to obtain a next value for the accumulator j;
   e) said correspondent swapping in said state information table S said state information identified by entry i in the state information table S with state information identified by entry j in the state information table S using said next value for the accumulator j;
   f) said correspondent combining the entry i state information with the entry j state information swapped in step d) to generate a combined value t;
   g) said correspondent outputting state information identified by entry t in the state information table S as a byte of the key stream; and
   h) said correspondent combining said odd value c with the current value for the counter i to generate a next value for said counter i;
wherein said correspondent repeats steps d) to h) to produce each byte of the key stream.

2. The method according to claim 1 wherein the state information table S comprises n entries and computations are performed modulo n.

3. The method according to claim 2, wherein said odd value c is prime relative to n.

4. The method according to claim 2, wherein said combining in steps d, f, and h are additions modulo n.

5. The method according to claim 1 wherein said odd value c is derived from a publicly available session identifier.

6. A correspondent having a key stream generator for generating a key stream, the key stream generator comprising a counter i an accumulator j, and a state information table S having state information stored in n entries therein, said correspondent being configured to perform steps comprising:
   a) said correspondent using the counted, the accumulator j, and the state information table S to
      i) randomly distribute entries of the state information table S by swapping pairs of entries; and,
      ii) generate a pair of non-zero values a and b by, for each swapping pair, adding an entry to a and adding the other entry to b;
   b) said correspondent initializing the counter i with a and said correspondent initializing the accumulator j with b;
   c) said correspondent obtaining a constant odd value, c, greater than 1;
   d) said correspondent combining with a current value for the accumulator j, state information identified by entry i in the state information table S to obtain a next value for the accumulator j;
   e) said correspondent swapping in said state information table S said state information identified by entry i in the state information table S with state information identified by entry j in the state information table S using said next value for the accumulator j;
   f) said correspondent combining the entry i state information with the entry j state information swapped in step d) to generate a combined value t;
   g) said correspondent outputting state information identified by entry t in the state information table S as a byte of the key stream; and
   h) said correspondent combining said odd value c with the current value for the counter i to generate a next value for said counter i;
wherein said correspondent is configured to repeat steps d) to h) to produce each byte of the key stream.

7. The correspondent according to claim 6 wherein the state information table S comprises n entries and wherein the correspondent performs computations modulo n.

8. The correspondent according to claim 7, wherein said odd value c is prime relative to n.

9. The correspondent according to claim 7, wherein said combining in steps d, f, and h are additions modulo n.

10. The correspondent according to claim 6 wherein said odd value c is derived from a publicly available session identifier.

11. A non-transitory computer readable medium having stored thereon computer readable instructions for performing a method of generating a key stream in a correspondent, the correspondent including a counter i an accumulator j, and a state information table S having state information stored in n entries therein, the computer readable instructions comprising instructions for:
   a) said correspondent using the counter i, the accumulator j, and the state information table S to:
      i) randomly distribute entries of the state information table S by swapping pairs of entries; and,
      ii) generate a pair of non-zero values a and b by, for each swapping pair, adding an entry to a and adding the other entry to b;
   b) said correspondent initializing the counter I with a and said correspondent initializing the accumulator j with b;
   c) said correspondent obtaining a constant odd value, c, greater than 1;
   d) said correspondent combining with a current value for the accumulator j, state information identified by entry i in the state information table S to obtain a next value for the accumulator;
   e) said correspondent swapping in said state information table S said state information identified by entry i in the state information table S with state information identified by entry j in the in the state information table S using said next value for the accumulator j;
   f) said correspondent combining the entry i state information with the entry j state information swapped in step d) to generate a combined value t;
   g) said correspondent outputting state information identified by entry t in the state information table S as a byte of the key stream; and
   h) said correspondent combining said odd value c with the current value for the counter i to generate a next value for said counter i;
wherein said instructions further comprise instructions for said correspondent repeating steps d) to h) to produce each byte of the key stream.

12. The computer readable medium according to claim 11 wherein the state information table S comprises n entries and wherein computations in said instructions are performed modulo n.

13. The computer readable medium according to claim 12, wherein said odd value c is prime relative to n.

14. The computer readable medium according to claim 12, wherein said combining in steps d, f, and h are additions modulo n.

15. The computer readable medium according to claim 11 wherein said odd value c is derived from a publicly available session identifier.

16. A correspondent in a data communication system comprising:
   a) a counter i;
   b) an accumulator j;
   c) a state information table S having state information stored in n entries therein;
   d) means for using the counter i the accumulator j, and the state information table S to:
      i) randomly distribute entries of the state information table S by swapping pairs of entries;
      ii) generate a pair of non-zero values a and b by, for each swapping pair, adding an entry to a and adding the other entry to b; and,
      c) initialize the counter i with a and to initialize the accumulator j with b;
   e) means for combining with a current value for the accumulator j, state information identified by entry i in the state information table S to obtain a next value for the accumulator j;
   f) means for swapping in said state information table S said state information identified by entry i in the state information table S using said next value for the accumulator j;
   g) means for combining the entry i state information with the entry j state information to generate a combined value t;
   h) means for using state information identified by entry t in the state information table S as a byte of a key stream; and
   i) means for combining a constant odd value, c, greater than 1, with the current value for the counter i to generate a next value for said counter i;
wherein said correspondent is configured to generate the key stream using elements a) to i).

* * * * *